US012596065B2

(12) United States Patent
Zhang et al.

(10) Patent No.: US 12,596,065 B2
(45) Date of Patent: Apr. 7, 2026

(54) DETERMINING PARAMETERS OF A ROCK SAMPLE

(71) Applicant: Saudi Arabian Oil Company, Dhahran (SA)

(72) Inventors: Jilin Jay Zhang, Houston, TX (US); Hui-Hai Liu, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 326 days.

(21) Appl. No.: 18/481,731

(22) Filed: Oct. 5, 2023

(65) Prior Publication Data

US 2025/0116592 A1     Apr. 10, 2025

(51) Int. Cl.
*G01N 15/08* (2006.01)
*G01N 33/24* (2006.01)

(52) U.S. Cl.
CPC .................................. *G01N 15/088* (2013.01)

(58) Field of Classification Search
CPC ...... G01N 15/00; G01N 15/08; G01N 15/088; G01N 33/24
See application file for complete search history.

(56) References Cited

U.S. PATENT DOCUMENTS

| | | | |
|---|---|---|---|
| 11,530,972 B2 | 12/2022 | Liu et al. | |
| 11,643,924 B2 | 5/2023 | Zhang et al. | |
| 11,680,887 B1 | 6/2023 | Zhang et al. | |
| 2021/0372914 A1* | 12/2021 | Akkutlu | G01N 33/24 |

FOREIGN PATENT DOCUMENTS

| | | | | |
|---|---|---|---|---|
| CN | 113640119 A | * | 11/2021 | ............. G01N 15/08 |

OTHER PUBLICATIONS

Machine Translation of CN-113640119-A (Year: 2021).*
Civan, "Effective-Stress Coefficients of Porous Rocks Involving Shocks and Loading / Unloading Hysteresis," SPE Journal, Feb. 2021, 24 pages.
Hasanov et al., "Effective Stress Law for Permeability of a Mudstone Sample," presented at the SEG International Exposition and 88th Annual Meeting, Anaheim, California, Oct. 14-19, 2018, 5 pages.

(Continued)

*Primary Examiner* — Nguyen Q. Ha
(74) *Attorney, Agent, or Firm* — Fish & Richardson P.C.

(57) ABSTRACT

Techniques for determining properties of a rock sample include performing a plurality of series of permeability measurements of a rock sample with a permeability test assembly to derive permeability values, where each series includes permeability measurements of the rock sample at a respective, constant differential pressure between a particular confining pressure and a particular pore pressure; for each series of the plurality of series, performing a curve fit operation to determine a slope and an intercept of a curve associated with a selected Biot coefficient, the permeability values, and the particular pore pressures to generate a plurality of slope values and a plurality of intercept values; determining an effective stress coefficient of the rock sample; and determining an actual Biot coefficient of the rock sample.

32 Claims, 7 Drawing Sheets

(56) References Cited

OTHER PUBLICATIONS

Ma et al., "Laboratory Experiments Simulating Poroelastic Stress Changes Associated with Depletion and Injection in Low-Porosity Sedimentary Rocks," Journal of Geophysical Research: Solid Earth, Apr. 2017, 26 pages.
Sone, "Mechanical Properties of Shale Gas Reservoir Rocks and Its Relation to the In-Situ Stress Variation Observed in Shale Gas Reservoirs," Dissertation for the degree of Doctor of Philosophy, Mar. 2012, 247 pages.

* cited by examiner

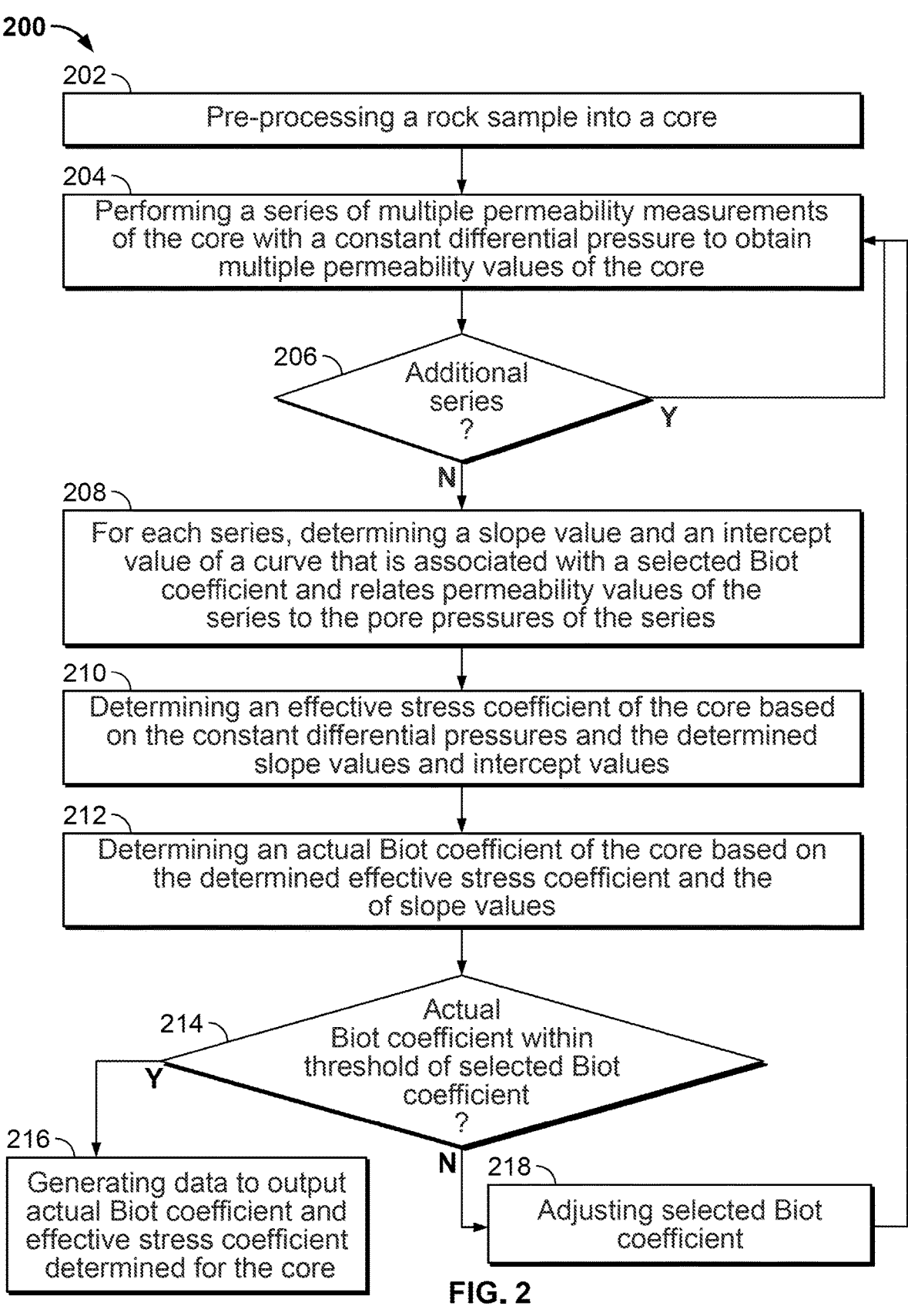

200

202 — Pre-processing a rock sample into a core

204 — Performing a series of multiple permeability measurements of the core with a constant differential pressure to obtain multiple permeability values of the core 206 — Additional series ?

Y

N

208 — For each series, determining a slope value and an intercept value of a curve that is associated with a selected Biot coefficient and relates permeability values of the series to the pore pressures of the series 210 — Determining an effective stress coefficient of the core based on the constant differential pressures and the determined slope values and intercept values 212 — Determining an actual Biot coefficient of the core based on the determined effective stress coefficient and the of slope values 214 — Actual Biot coefficient within threshold of selected Biot coefficient ?

Y

N

216 — Generating data to output actual Biot coefficient and effective stress coefficient determined for the core 218 — Adjusting selected Biot coefficient

| | | 302 | 304 | 306 | 308 | 310 | 312 | 314 | 316 |

| s | m | $p_c$ (psi) | $p_p$ (psi) | $\Delta p_{cp}$(psi] | $\sigma_{eff}$(psi) | $\Delta(\sigma_{eff})$ | K (nD) |
|---|---|---|---|---|---|---|---|
| 1 | 1 | 4640 | 1740 | 2900 | 3422 | | 280 |
| 1 | 2 | 5075 | 2175 | 2900 | 3552.5 | 130.5 | 280 |
| 1 | 3 | 5800 | 2900 | 2900 | 3770 | 217.5 | 279 |
| 1 | 4 | 6525 | 3625 | 2900 | 3987.5 | 217.5 | 266 |
| 1 | 5 | 7250 | 4350 | 2900 | 4205 | 217.5 | 275 |
| 1 | 6 | 7975 | 5075 | 2900 | 4422.5 | 217.5 | 266 |
| 1 | 7 | 8700 | 5800 | 2900 | 4640 | 217.5 | 265 |
| 2 | 8 | 9425 | 6525 | 2900 | 4857.5 | 217.5 | 258 |
| 2 | 9 | 6090 | 1740 | 4350 | 4872 | 14.5 | 194 |
| 2 | 10 | 6525 | 2175 | 4350 | 5002.5 | 130.5 | 193 |
| 2 | 11 | 7250 | 2900 | 4350 | 5220 | 217.5 | 189 |
| 2 | 12 | 7975 | 3625 | 4350 | 5437.5 | 217.5 | 183 |
| 2 | 13 | 8700 | 4350 | 4350 | 5655 | 217.5 | 176 |
| 2 | 14 | 9425 | 5075 | 4350 | 5872.5 | 217.5 | 173 |
| 2 | 15 | 10150 | 5800 | 4350 | 6090 | 217.5 | 169 |
| 2 | 16 | 10875 | 6525 | 4350 | 6307.5 | 217.5 | 169 |
| 3 | 17 | 7540 | 1740 | 5800 | 6322 | 14.5 | 152 |
| 3 | 18 | 7975 | 2175 | 5800 | 6452.5 | 130.5 | 148 |
| 3 | 19 | 8700 | 2900 | 5800 | 6670 | 217.5 | 140 |
| 3 | 20 | 9425 | 3625 | 5800 | 6887.5 | 217.5 | 138 |
| 3 | 21 | 10150 | 4350 | 5800 | 7105 | 217.5 | 131 |
| 3 | 22 | 10875 | 5075 | 5800 | 7322.5 | 217.5 | 132 |
| 3 | 23 | 11600 | 5800 | 5800 | 7540 | 217.5 | 127 |
| 3 | 24 | 12325 | 6525 | 5800 | 7757.5 | 217.5 | 126 |
| 4 | 25 | 8990 | 1740 | 7250 | 7772 | 14.5 | 122 |
| 4 | 26 | 9425 | 2175 | 7250 | 7902.5 | 130.5 | 122 |
| 4 | 27 | 10150 | 2900 | 7250 | 8120 | 217.5 | 114 |
| 4 | 28 | 10875 | 3625 | 7250 | 8337.5 | 217.5 | 111 |
| 4 | 29 | 11600 | 4350 | 7250 | 8555 | 217.5 | 108 |
| 4 | 30 | 12325 | 5075 | 7250 | 8772.5 | 217.5 | 107 |
| 4 | 31 | 13050 | 5800 | 7250 | 8990 | 217.5 | 103 |
| 4 | 32 | 13775 | 6525 | 7250 | 9207.5 | 217.5 | 102 |
| 5 | 33 | 10440 | 1740 | 8700 | 9222 | 14.5 | 107 |
| 5 | 34 | 10875 | 2175 | 8700 | 9352.5 | 130.5 | 106 |
| 5 | 35 | 11600 | 2900 | 8700 | 9570 | 217.5 | 103 |
| 5 | 36 | 12325 | 3625 | 8700 | 9787.5 | 217.5 | 99 |
| 5 | 37 | 13050 | 4350 | 8700 | 10005 | 217.5 | 96 |
| 5 | 38 | 13775 | 5075 | 8700 | 10222.5 | 217.5 | 92 |

FIG. 3

| $s$ | $\Delta p_{cp}$ (psi) | $\zeta_s$ (psi$^{-1}$) | $I_s$ |
|---|---|---|---|
| 1 | 2900 | -2.4033E-05 | 5.669492 |
| 2 | 4350 | -3.2359E-05 | 5.326314 |
| 3 | 5800 | -3.8897E-05 | 5.071181 |
| 4 | 7250 | -3.9950E-05 | 4.868432 |
| 5 | 8700 | -4.0340E-05 | 4.743361 |

DETERMINING PARAMETERS OF A ROCK SAMPLE

TECHNICAL FIELD

The present disclosure describes systems and methods for determining one or more parameters of a rock sample and, more particularly, determining a Biot coefficient and an effective stress dependence, as well as other parameters, of a rock sample.

BACKGROUND

It can be challenging to measure a permeability of unconventional source rocks and their related effective stress dependence, such as the effective stress dependence coefficient and Biot coefficient. Moreover, permeability remains to be one of the most important parameters in the exploration assessment and production prediction for source rock reservoirs.

One of the challenges is related to the presence of soft components, such as total organic carbon (TOC) and clays, which cause the partial loss of elasticity of the rock samples, thus resulting in the phenomenon called hysteresis. When one measures the permeability at a first stress condition, and then subjects the sample to a higher stress at a second stress condition, and then returns to the first stress condition, the permeability measured at the second time at the first stress condition is much smaller than permeability measured at the first time at the first stress condition. If the samples show the hysteresis, the extracted parameters of the permeability and the related stress dependence from the permeability measurements can all be grossly inaccurate.

SUMMARY

In an example implementation, a method of determining one or more properties of a rock sample includes (i) performing a plurality of series of permeability measurements of a rock sample with a permeability test assembly to derive a plurality of permeability values, where each series of the plurality of series includes a plurality of permeability measurements of the rock sample at a respective, constant differential pressure between a particular confining pressure and a particular pore pressure, the particular confining pressure and the particular pore pressure increase with each permeability measurement within each series of the plurality of permeability measurements, and the respective, constant differential pressure increases with each subsequent series of permeability measurements in the plurality of series of permeability measurements. The method includes: (ii) for each series of the plurality of series, performing a curve fit operation to determine a slope and an intercept of a curve associated with a selected Biot coefficient that is between 0 and 1, the permeability values of the series, and the particular pore pressures of the series to generate a plurality of slope values and a plurality of intercept values; (iii) determining an effective stress coefficient of the rock sample based on the respective, constant differential pressures and the generated plurality of slope values and plurality of intercept values; and (iv) determining an actual Biot coefficient of the rock sample based on the determined effective stress coefficient and the plurality of slope values.

In an aspect combinable with the example implementation, the particular pore pressure of a first series of the plurality of series is at least 1700 psi.

In another aspect combinable with any of the previous aspects, the plurality of series include at least three series, and the plurality of permeability measurements include at least three permeability measurements.

In another aspect combinable with any of the previous aspects, the selected Biot coefficient is at a lower boundary value of a predetermined range.

Another aspect combinable with any of the previous aspects further includes determining an effective stress differential between successive permeability measurements in a particular series of permeability measurements; and adjusting at least one of the particular confining pressure or the particular pore pressure in the particular series based on the determined effective stress differential being negative.

Another aspect combinable with any of the previous aspects further includes adjusting at least one of the particular confining pressure or the particular pore pressure in a particular series to maintain a non-negative effective stress differential between successive permeability measurements in the particular series of permeability measurements.

In another aspect combinable with any of the previous aspects, performing the curve fit operation includes: for each series of the plurality of series, plotting a curve of ln(k) versus the particular pore pressures for the respective, constant differential pressure of the series, where k is the permeability value measured for each particular pore pressure for the respective, constant differential pressure of the series; and determining the slope value and the intercept value from the plotted curve.

In another aspect combinable with any of the previous aspects, determining the effective stress coefficient of the rock sample includes plotting a curve of the plurality of intercept values versus the respective, constant differential pressures of the series; and determining the effective stress coefficient of the rock sample based on the slope of the plotted curve.

In another aspect combinable with any of the previous aspects, determining the actual Biot coefficient of the rock sample includes for each series of the plurality of series, determining a Biot coefficient based on the determined effective stress coefficient and the slope value for the series; and determining the actual Biot coefficient based on an average of the determined Biot coefficients.

Another aspect combinable with any of the previous aspects further includes determining a difference between the determined actual Biot coefficient and the selected Biot coefficient; based on the difference exceeding a threshold value, determining another selected Biot coefficient; and repeating (i)-(iv) with the another selected Biot coefficient.

In another example implementation, a system for determining one or more properties of a rock sample includes a permeability test assembly configured to perform a plurality of series of permeability measurements of a rock sample to derive a plurality of permeability values. Each series of the plurality of series includes a plurality of permeability measurements of the rock sample at a respective, constant differential pressure between a particular confining pressure and a particular pore pressure. The particular confining pressure and the particular pore pressure increase with each permeability measurement within each series of the plurality of permeability measurements. The respective, constant differential pressure increases with each subsequent series of permeability measurements in the plurality of series of permeability measurements. The system includes a control system configured to perform operations including: identifying the plurality of permeability values, the respective, constant differential pressure for each series, the particular confining pressures, and the particular pore pressures from the permeability test assembly; for each series of the plurality of series, performing a curve fit operation to determine a slope and an intercept of a curve associated with a selected Biot coefficient that is between 0 and 1, the permeability values of the series, and the particular pore pressures of the series to generate a plurality of slope values and a plurality of intercept values; determining an effective stress coefficient of the rock sample based on the respective, constant differential pressure and the generated plurality of slope values and plurality of intercept values; and determining an actual Biot coefficient of the rock sample based on the determined effective stress coefficient and the plurality of slope values.

In an aspect combinable with the example implementation, the particular pore pressure of a first series of the plurality of series is at least 1700 psi.

In another aspect combinable with any of the previous aspects, the plurality of series include at least three series, and the plurality of permeability measurements include at least three permeability measurements.

In another aspect combinable with any of the previous aspects, the selected Biot coefficient is between 0.7 and 1.

In another aspect combinable with any of the previous aspects, the operations further include determining an effective stress differential between successive permeability measurements in a particular series of permeability measurements, and the permeability test assembly is configured to adjust at least one of the particular confining pressure or the particular pore pressure in the particular series based on the determined effective stress differential being negative.

In another aspect combinable with any of the previous aspects, the permeability test assembly is configured to adjust at least one of the particular confining pressure or the particular pore pressure in a particular series to maintain a non-negative effective stress differential between successive permeability measurements in the particular series of permeability measurements.

In another aspect combinable with any of the previous aspects, the operation of performing the curve fit operation includes, for each series of the plurality of series, plotting a curve of ln(k) versus the particular pore pressures for the respective, constant differential pressure of the series, where k is the permeability value measured for each particular pore pressure for the respective, constant differential pressure of the series; and determining the slope value and the intercept value from the plotted curve.

In another aspect combinable with any of the previous aspects, the operation of determining the effective stress coefficient of the rock sample includes plotting a curve of the plurality of intercept values versus the respective, constant differential pressures of the series; and determining the effective stress coefficient of the rock sample based on the slope of the plotted curve.

In another aspect combinable with any of the previous aspects, the operation of determining the actual Biot coefficient of the rock sample includes for each series of the plurality of series, determining a Biot coefficient based on the determined effective stress coefficient and the slope value for the series; and determining the actual Biot coefficient based on an average of the determined Biot coefficients.

In another aspect combinable with any of the previous aspects, the operations further include determining a difference between the determined actual Biot coefficient and the selected Biot coefficient; and based on the difference exceeding a threshold value, determining another selected Biot coefficient.

In another aspect combinable with any of the previous aspects, the operations further include identifying another plurality of permeability values, another respective, constant differential pressure for another plurality of series, another set of particular confining pressures, and another set of particular pore pressures from the permeability test assembly; for each series of the another plurality of series, performing a curve fit operation to determine a slope and an intercept of a curve associated with the another selected Biot coefficient, the another plurality of permeability values of the another plurality of series, and the another set of particular pore pressures of the series to generate another plurality of slope values and another plurality of intercept values; determining another effective stress coefficient of the rock sample based on the another respective, constant differential pressure and the generated another plurality of slope values and plurality of intercept values; and determining another actual Biot coefficient of the rock sample based on the determined another effective stress coefficient and the another plurality of slope values.

In another example implementation, a computer-implemented method for determining one or more properties of a rock sample includes identifying, with one or more hardware processors, information from a plurality of series of permeability measurements of a rock sample taken by a permeability test assembly, the information including a plurality of permeability values, with each series of the plurality of series including a set of permeability measurements of the rock sample at a respective, constant differential pressure between a particular confining pressure and a particular pore pressure, with the particular confining pressure and the particular pore pressure increasing with each permeability measurement within each series of the plurality of permeability measurements, and the respective, constant differential pressure increases with each subsequent series of permeability measurements in the plurality of series of permeability measurements; for each series of the plurality of series, performing, with the one or more hardware processors, a curve fit operation to determine a slope and an intercept of a curve associated with a selected Biot coefficient that is between 0 and 1, the permeability values of the series, and the particular pore pressures of the series to generate a plurality of slope values and a plurality of intercept values; determining, with the one or more hardware processors, an effective stress coefficient of the rock sample based on the respective, constant differential pressure and the generated plurality of slope values and plurality of intercept values; and determining, with the one an actual Biot coefficient of the rock sample based on the determined effective stress coefficient and the plurality of slope values.

In an aspect combinable with the example implementation, the particular pore pressure of a first series of the plurality of series is at least 1700 psi.

In another aspect combinable with any of the previous aspects, the plurality of series include at least three series, and the plurality of permeability measurements include at least three permeability measurements.

In another aspect combinable with any of the previous aspects, the selected Biot coefficient is between 0.7 and 1.

Another aspect combinable with any of the previous aspects further includes determining, with the one or more hardware processors, an effective stress differential between successive permeability measurements in a particular series of permeability measurements; and providing, with the one or more hardware processors, an indication to adjust at least one of the particular confining pressure or the particular pore pressure in the particular series based on the determined effective stress differential being negative.

Another aspect combinable with any of the previous aspects further includes providing, with the one or more hardware processors, an indication to adjust at least one of the particular confining pressure or the particular pore pressure in a particular series to maintain a non-negative effective stress differential between successive permeability measurements in the particular series of permeability measurements.

In another aspect combinable with any of the previous aspects, performing the curve fit operation includes, for each series of the plurality of series, plotting, with the one or more hardware processors, a curve of ln(k) versus the particular pore pressures for the respective, constant differential pressure of the series, where k is the permeability value measured for each particular pore pressure for the respective, constant differential pressure of the series; and determining, with the one or more hardware processors, the slope value and the intercept value from the plotted curve.

In another aspect combinable with any of the previous aspects, determining the effective stress coefficient of the rock sample includes plotting, with the one or more hardware processors, a curve of the plurality of intercept values versus the respective, constant differential pressures of the series; and determining, with the one or more hardware processors, the effective stress coefficient of the rock sample based on the slope of the plotted curve.

In another aspect combinable with any of the previous aspects, determining the actual Biot coefficient of the rock sample includes, for each series of the plurality of series, determining, with the one or more hardware processors, a Biot coefficient based on the determined effective stress coefficient and the slope value for the series; and determining, with the one or more hardware processors, the actual Biot coefficient based on an average of the determined Biot coefficients.

Another aspect combinable with any of the previous aspects further includes determining, with the one or more hardware processors, a difference between the determined actual Biot coefficient and the selected Biot coefficient; and based on the difference exceeding a threshold value, determining, with the one or more hardware processors, another selected Biot coefficient.

Another aspect combinable with any of the previous aspects further includes identifying, with the one or more hardware processors, additional information from the permeability test assembly, the additional information including another plurality of permeability values, another respective, constant differential pressure for another plurality of series, another set of particular confining pressures, and another set of particular pore pressures from the permeability test assembly; for each series of the another plurality of series, performing, with the one or more hardware processors, a curve fit operation to determine a slope and an intercept of a curve associated with the another selected Biot coefficient, the another plurality of permeability values of the another plurality of series, and the another set of particular pore pressures of the series to generate another plurality of slope values and another plurality of intercept values; determining, with the one or more hardware processors, another effective stress coefficient of the rock sample based on the another respective, constant differential pressure and the generated another plurality of slope values and plurality of intercept values; and determining, with the one or more hardware processors, another actual Biot coefficient of the rock sample based on the determined another effective stress coefficient and the another plurality of slope values.

Implementations of systems and methods for determining rock sample parameters according to the present disclosure may include one or more of the following features. For example, implementations according to the present disclosure can determine parameters such as Biot coefficient and effective stress dependence coefficient while reducing or eliminating hysteresis effects. As another example, implementations according to the present disclosure can result in a better estimation of a permeability's evolution with the pore pressure changes as time goes during the production, thus in an accurate estimation of the total hydrocarbon production prediction, hence in a better economic evaluation of the well(s)/filed(s) of production.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flowchart that describes an example method for determining one or more parameters of a rock sample according to the present disclosure.

FIG. 3 is a table that shows measured values taken during multiple series of permeability measurements taken by a permeability test assembly, as well as rock sample parameters derived from the permeability measurements according to the present disclosure.

FIG. 5 is a table that shows derived slopes and intercepts from multiple series of permeability tests with a permeability test assembly according to the present disclosure.

DETAILED DESCRIPTION

The present disclosure describes methods and systems for determining one or more parameters of a rock sample using multiple series of multiple permeability tests on the sample. In some aspects, the determined parameters can include the Biot coefficient, which is a ratio of the volume of the fluid change divided by the change in bulk volume of the rock sample under the constraint that pore pressure remains constant. In some aspects, the determined parameters can include the effective stress dependence coefficient.

Techniques disclosed in the present disclosure can address the problem of hysteresis by using a permeability test assembly to acquire data (for example, permeability values and other data) for a rock sample with a pre-selected value of a poroelastic constant, such as the Biot coefficient. For instance, multiple series of permeability tests—with each series including multiple, individual permeability tests of the rock sample, can be performed to acquire the data. Each series can be conducted at a particular, constant difference between a confining pressure and a pore pressure; this differential pressure can be defined in the present disclosure as $\Delta P_{cp}$.

With each successive series (the number of which can be 2, 3, 4, 5, 6, or greater), a different, but increased differential pressure can be used. Within each series, each successive permeability test (the number of which can be 2, 3, 4, 5, 6, or greater) performed with the permeability test assembly can be at the particular differential pressure (which is constant for a series) but with a different and increasing confining pressure and pore pressure. Thus, while within each series the confining pressure and pore pressure change (and increase) with each successive permeability test, the differential pressure, $\Delta P_{cp}$, stays the same and is thus constant within the series.

Thus, the measurement procedure according to the present disclosure is arranged in such a way that an effective stress on the rock sample always remains the same or goes up with each successive test within a series of permeability tests, as well as from series to series. Consequently, the undesirable hysteresis effect can be eliminated or reduced by using a selected Biot coefficient, $\beta$, that is within a known range. Generally, $\beta$ can be between 0 and 1, and the selected Biot coefficient used in the procedure can be, for example, between 0.7 and 1.

Figure 1:
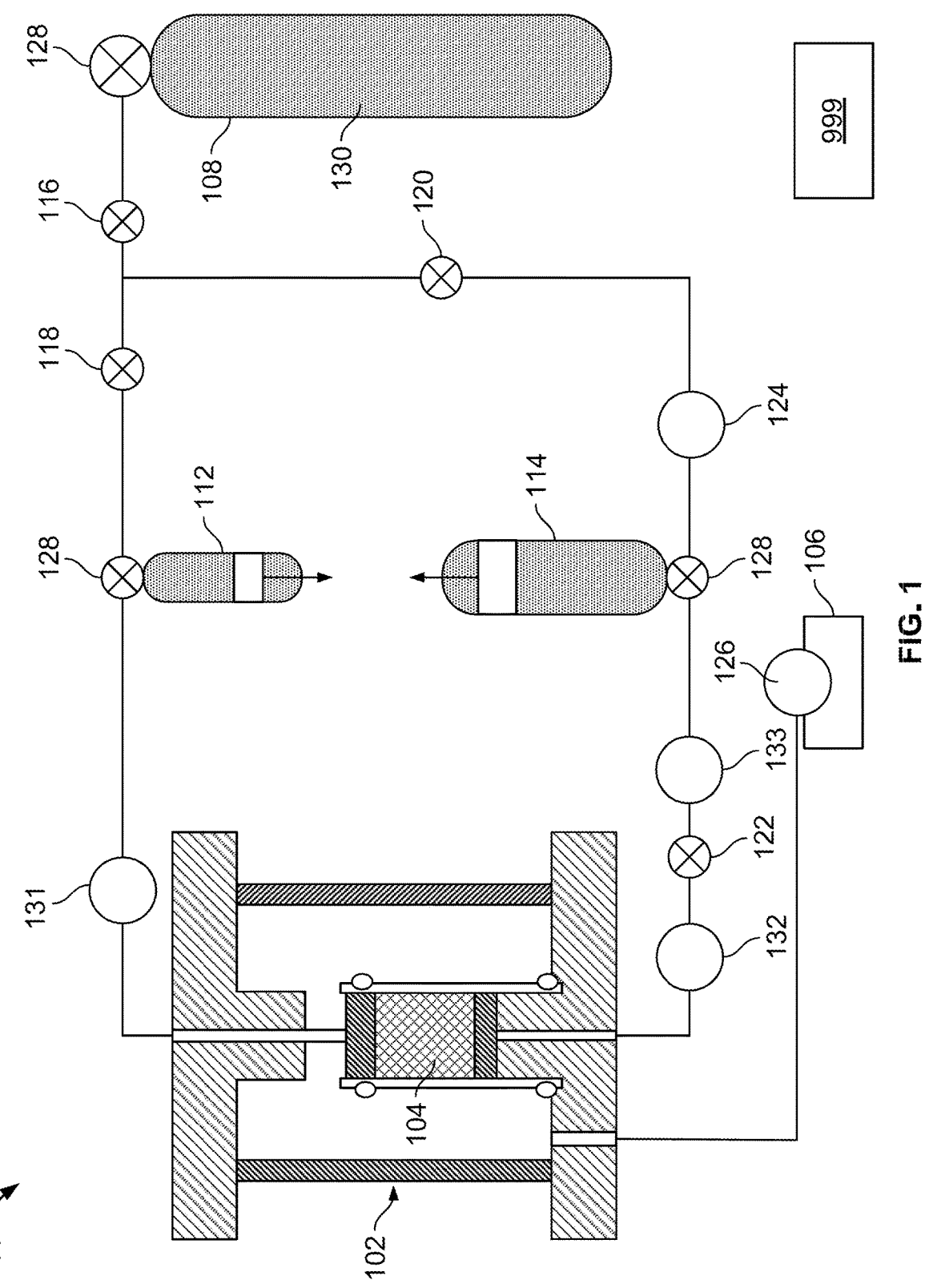
FIG. 1 is a schematic diagram of an example implementation of a permeability test assembly according to the present disclosure.

FIG. 1 is a schematic diagram of an example implementation of a permeability test assembly 100 according to the present disclosure. Generally, any commercial permeability test assembly can be used as the assembly 100, provided that the assembly can apply a confining pressure to a rock sample and determine a permeability value of the rock sample at the applied confining pressure. The permeability test assembly 100 can be any permeability equipment that can perform pulse decay test or steady state tests or any other permeability tests and determine permeability values of a rock sample. In this example, the permeability test assembly 100 includes a confining cell 102 to accommodate a rock sample 104, also called core 104. In some aspects, the core 104 can be from an unconventional rock reservoir.

Prior to placing the core 104 in the confining cell 102, the core can be pre-processed; thus, according to the present disclosure, core 104 can represent a raw core (not pre-processed) or a pre-processed core. In some examples, pre-processing can include cleaning or otherwise treating the core 104 and can also include shaping the core 104 to particular dimensions. For example, the core 104 can start as a rock sample that is then shaped into a cylinder for the permeability measurements (also called plugging of the sample). The core 104, in some examples, can have a diameter of between 1 and 1.5 inches and a length of between 0.5 to 2 inches. However, such dimensions are just examples. The rock sample that is taken from the rock reservoir and shaped into the core 104 can be trimmed so it has two round end-faces that are perpendicular to a lengthwise axis.

In some aspects, the rock sample from which the core 104 is formed, or the core 104 itself, can be cleaned, which can include subjecting the core 104 to a solvent (possibly at an elevated temperature) and/or drying at an elevated temperature under a vacuum. The core 104 (or rock sample) can be cooled with minimum contact of moisture such as in a desiccator.

The permeability test assembly 100 includes a pump (or other fluid mover) 106 that is fluidly connected to the confining cell 102. The pump 106 is operable (for example, by a control system 999) to generate a confining pressure 126 on the core 104 in the confining cell 102. In this example, the permeability test assembly 100 includes a fluid (for example, gas) injection circuit that comprises a fluid reservoir 108 that holds a supply of a fluid 130, such as a gas (for example, a noble gas or otherwise).

The circuit further includes pumps 112 and 114 between which the core 104 is placed and are used to produce a pressure differential. The reservoir 108 can be fluidly connected to supply the fluid 130 to the pumps 112 and 114 by opening valves 116, 118, and 120 (as well as any necessary shut off valves). Digital pressure gauges 124, 131, 132, 133 can be used to measure the pore pressures at various locations between both sides of the core 104 (and can, for instance, transmit the measure differential to the control system 999). Shut off valves 128 are placed within permeability test assembly 100 to fluidly isolate certain components when needed.

The core 104 is subjected to the confining pressure 126. The hydrostatic pressure is then applied to all sides of the samples; the two pumps 114 and 116 are at the same pressure and are connected by opening valves 118, 120, 128, and 122. The internal pressure of the confining cell 102 can be balanced and the injection circuits can be isolated by closing valves 118 and 120. After situating the sample at a desired pressure through adjusting the pumps 112 and 114 while the valves 118 and 120 are closed, a slight excess in injection pressure can be applied to pump 114, then valve 122 is opened to allow the fluid 130 to diffuse over the core 104 for pulse decay tests. For steady state permeability measurements, a constant pressure drop can be managed by controlling the pumps 112 and 114 via the program 999 while the pressures and the flow rates are recorded by pressure gauges 131, 132, 133 and pumps 112 and 114 respectively, with the valves 118 and 120 closed and other valves around the sample opened.

Operation of the permeability test assembly 100 results in individual measurements of confining pressures, pore pressures, as well as permeability, k, of the core 104 (for example, by the control system 999). In this example, the control system 999 can be a micro-processor based controller which is communicably coupled, for example, to the a combination of pressure sensors 131, 132, and 133 (as well as any other components that measure pressures or the pump speed at pumps 112 and 114) to order to identify or receive pressure measurement values during operation of the permeability test assembly 100. In some aspects, the control system 999 determines a measured permeability value for each operation of the permeability test assembly 100 such as by a numerical analysis (for example, finite element) or other methods.

FIG. 2 is a flowchart that describes an example method 200 for determining one or more parameters of a rock sample according to the present disclosure. For example, method 200 can be performed with the permeability test assembly 100 shown in FIG. 1, including the control system 999. In some aspects, one or more steps of method 200 can be performed by the control system, while one or more steps can be performed by the permeability test assembly 100, itself.

Method 200 can begin at step 202, which includes pre-processing a rock sample into a core. For example, as described, a rock sample 104, or core 104, can first be shaped, cleaned, or dried (or a combination thereof) prior to being placed in the confining cell 102 of the permeability test assembly 100. However, in some aspects, this step can be skipped, and a raw rock sample or core 104 (for example, that is taken directly from a reservoir formation and, at most, shaped into a particular shape or size, is placed in the confining cell 102.

Method 200 can continue at step 204, which includes performing a series of multiple permeability measurements of the core with a constant differential pressure (also called net confining pressure, calculated by subtracting the mean pore pressure $P_p$ from the confining pressure $P_c$, $\Delta P_{cp} = P_c - P_p$) to obtain multiple permeability values of the core. For example, once the core 104 is placed into the confining cell 102, the permeability test assembly 100 can be operated (for example, by the control system 999 or otherwise by an operator) to test the core 104 under particular confining and pore pressures to determine a permeability value at such confining and pore pressure. A differential pressure, $\Delta p_{cp}$, is also associated with the test, and is a difference between the confining pressure $p_c$ and the pore pressure $p_p$ during the test, which can also be called the net confining pressure. In some aspects, for example to minimize or exclude the effect of Knudsen diffusion, the minimum pore pressure for any test is kept at 1700 psi or above. however, this value can change with pore throat size, e.g., if the sample has a much smaller diameter, the particular pore pressure of a first series of the plurality of series can be raised accordingly.

In step 204, a series of individual permeability tests are performed. In some aspects, a series according to the present disclosure can be multiple (for example, 2, 3, 4, 5, 6, or more), individual permeability tests performed on the core 104 at a particular, constant differential pressure. Each test in the series, while having the same differential pressure, is conducted with different, but increasing confining and pore pressure values by the permeability test assembly 100. Thus while a second test in the series is conducted at the same differential pressure as a first test in the series, the confining and pore pressures of the second test in the series is greater than the confining and pore pressures of the first test in the series and the estimated effective stress $\sigma_{eff}$ using the lower value 0.7 of the selected Biot's range between 0.7 and 1 would remain the same or go up in one direction (for example as shown in column 312 in table 300 in FIG. 3).

By conducting the series of tests in such a way, an effective stress, $\sigma_{eff}$, remains non-negative (in other words, either the same or greater with each successive test) from test to test, as effective stress is defined as:

$$\sigma_{eff} = p_c - \beta p_p = \Delta p_{cp} + (1 - \beta)p_p. \qquad \text{Eq. 1}$$

In Eq. 1, $p_c$ is confining pressure, $p_p$ is pore pressure, and $\beta$ is a selected (with pre-known estimated range) Biot coefficient value. As the confining and pore pressures can be selected for each permeability test in the series, the differential pressure remains constant and the effective stress does not decrease from test to test. Consequently, the undesirable hysteresis effect can be eliminated within the series of tests.

After the completion of step 204, therefore, a number, m, of permeability tests have been conducted on the core 104, with each test in the same series having the same differential pressure (that is different from the differential pressure of the previous series), increasing confining and pore pressures in each successive test, and a non-negative change in effective stress with each successive test series. This can be expressed as:

$$\Delta(\sigma_{eff}) > 0 \text{ when } m - \rightarrow m + 1. \qquad \text{Eq. 2}$$

The effective stress differential can also be expressed as:

$$\Delta(\sigma_{eff}) = \sigma_{eff}^{[m+1]} - \sigma_{eff}^{[m]} = \Delta p_{cp}^{[m+1]} - \Delta p_{cp}^{[m]} + (1 - \beta)\left(p_p^{[m+1]} - p_p^{[m]}\right). \qquad \text{Eq. 3}$$

Method 200 can continue at step 206, in which a determination is made as to whether or not an additional series of tests is to be performed. For example, method 200 may include multiple (for example, 2, 3, 4, 5, 6, or more) series of permeability tests (in other words, multiple iterations of step 204). Therefore, if the determination in step 206 is yes, then method 200 continues back to repeat step 204. However, with each successive iteration of step 204 (in other words, with each successive series), the differential pressure is increased (but remains constant during the series). Thus, a constant differential pressure of a first series is less than a constant differential pressure of a next, second series.

Steps 204 and 206 can iterate for as long as there is an additional series of permeability tests to perform on the core 104. If the determination in step 206 is no, then the results of the iterations of step 204 can be tabulated, with an example shown in FIG. 3. FIG. 3 is a table 300 that shows measured values taken during multiple series of permeability measurements taken by the permeability test assembly 100, as well as rock sample parameters derived from the permeability measurements.

As shown in table 300, column 302 represents the series number (in this case, 5 series of tests). Column 304 represents the particular permeability test of all series (in this case, each series included between 6 and 9 permeability tests). Column 306 represents the confining pressure at each particular permeability test. Column 308 represents the pore pressure at each particular permeability test. Column 310 represents the differential pressure (confining pressure minus pore pressure) at each permeability test. Column 312 represents the effective stress (according to Eq. 1) at each permeability test, assuming a selected Biot coefficient. Column 314 represents the difference in effective stress between the current permeability test and the previous permeability test (according to Eq. 3; hence, the first row for this parameter is blank). Column 316 represents the measured permeability of the core 104 in that particular test. As shown, each series (1-5) has a particular, constant differential pressure and the confining and pore pressure increase for each test. Also, each effective stress differential is non-negative.

In this example, the pre-estimated range of Biot coefficient (for example, selected by the control system 999 or an operator as an estimate of the actual Biot coefficient of the core 104) is between 0.7 and 1. Thus, the calculation of effective stress in column 312 for this example used 0.7 in Eq. 1 for the selected Biot coefficient.

Method 200 can continue at step 208, which includes, for each series (in this example, series 1-5), determining a slope value and an intercept value of a curve that is associated with a selected Biot coefficient and that relates permeability values of the series to the pore pressures of the series. As noted in this example, the selected Biot coefficient is 0.7, which is used in Eq. 1 to calculate the test-specific effective stress. In some aspects, there is an exponential relationship between the permeability values and the effective stress, and this relationship can be expressed as:

$$\ln(k) = -\alpha \Delta p_{cp} + D - \alpha(1 - \beta)p_p, \qquad \text{Eq. 4}$$

where $\alpha$ is an effective stress dependence coefficient and D is a constant that equals $\ln(k_0)$, where $k_0$ is the permeability under zero effective stress. Thus, for each series which has a constant differential pressure, there is a linear relationship between $\ln(k)$ and $p_p$, with a slope, $\xi_s$, that equals $-\alpha(1-\beta)$ and an intercept, $I_s$, equal to $-\alpha\Delta p_{cp}+D$ according to:

$$\xi_s = -\alpha(1 - \beta), \quad \text{and} \qquad \text{Eq. 5}$$

$$I_s = -\alpha\Delta p_{cp} + D. \qquad \text{Eq. 6}$$

Figures 4A, 4B:
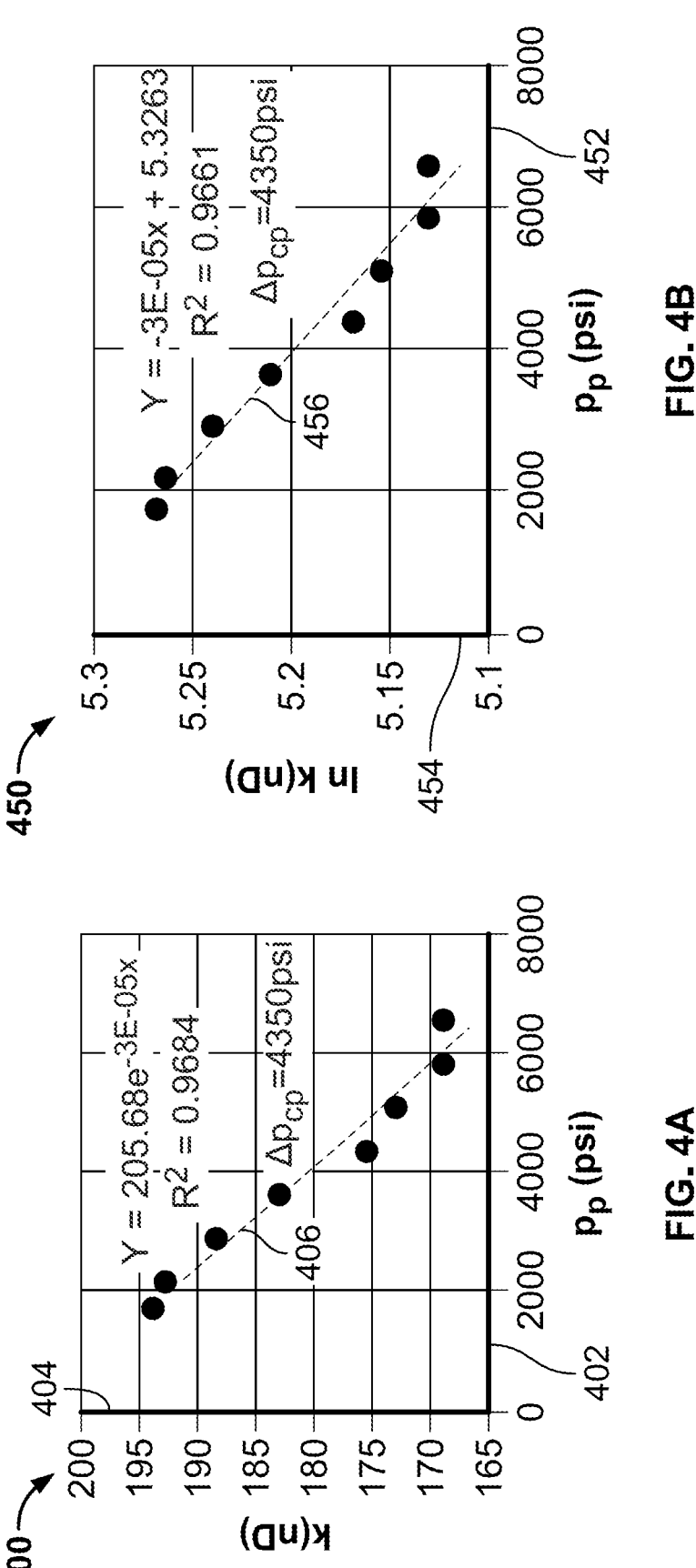
FIGS. 4A and 4B are graphs that show plots of permeability values versus differential pressures applied to a rock sample during permeability tests performed with a permeability test assembly according to the present disclosure.

For each series, therefore, a curve of permeability, k, versus pore pressure, $p_p$, can be plotted (with each point having the same differential pressure). FIGS. 4A and 4B are graphs 400 and 450, respectively, that show plots of permeability values versus pore pressures applied to for a particular series (in this example, the series where differential pressure is 4350 psi). Graph 400 includes an x-axis 402 of pore pressure (in psi) and a y-axis 404 of measured permeability values by the permeability test assembly 100 (in nanodarcys, nD). In this graph 400, an exponential relationship is shown between permeability and pore pressure for the particular series of differential pressure being constant at 4350 psi.

Graph 450 includes an x-axis 452 of pore pressure (in psi) and a y-axis 454 of the natural log of the measured permeability values by the permeability test assembly 100 (in nanodarcys). In this graph 450, a linear relationship is shown between the natural log of the permeability and pore pressure for the particular series of differential pressure being constant at 4350 psi.

A slope value and an intercept value can be determined for this particular differential pressure (in other words, this series) shown in graphs 400 and 450 in step 208 according to Eqs. 5 and 6. Since there are 5 series in this example (as shown in table 300), step 208 includes 5 determinations of slope valves and intercept values: one for each series (constant differential pressure).

The result of step 208 is shown in table 500 of FIG. 5. FIG. 5 is a table 500 that shows derived slopes and intercepts from the multiple series of permeability tests with the permeability test assembly 100. As shown column 502 represents the particular series. Column 504 represents the constant differential pressure in that series. Column 506 represents the derived or calculated slope values for the series (according to Eq. 5). Column 508 represents the derived or calculated intercept values for the series (according to Eq. 6).

Figure 6:
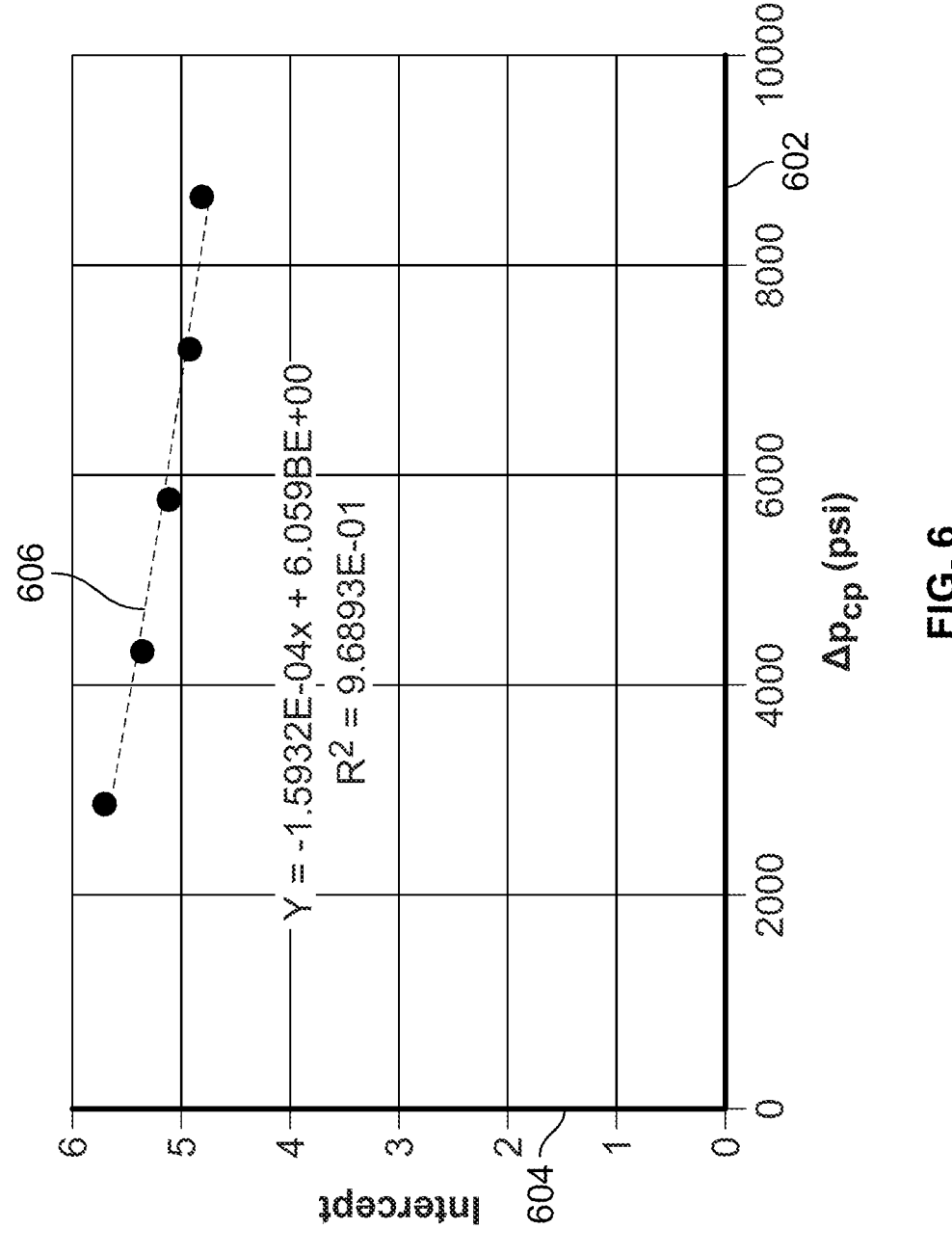
FIG. 6 is a graph that shows a plot of intercepts versus differential pressures applied to a rock sample during permeability tests performed with a permeability test assembly according to the present disclosure

Method 200 can continue at step 210, which includes determining an effective stress coefficient of the core based on the constant differential pressures and the determined slope values and intercept values. For example, based on Eq. 6, there is a linear relationship between the intercept values ($I_s$ in table 500) and the differential pressures (also shown in table 500 as $\Delta p_{cp}$). The values of table 500 can be plotted as a curve as shown in FIG. 6. FIG. 6 is a graph 600 that shows a plot of intercept values versus differential pressures applied to a rock sample during permeability tests performed with the permeability test assembly 100. As shown, graph 600 includes x-axis 602 of differential pressures and a y-axis 604 of intercept values. Because in this example there are 5 series (and thus five particular, constant differential pressure values), there are five points to the graph 600. A curve 606 can be curve-fit to these five points, with a slope, $\alpha$, of $1.5932 \times 10^{-4}$ (in $\text{psi}^{-1}$) and an intercept of 6.0598 (in other words, $k_0 = \exp(D) = -428$ nD). In this example, $R^2$ shows the accuracy of the fitting, with a value of 1 showing a perfect fitting, and in this case, $R^2$ is 0.9689.

Method 200 can continue at step 212, which includes determining an actual Biot coefficient of the core based on the determined effective stress coefficient and the of slope values. For example, based on Eq. 5, for each series, a "per series" actual Biot coefficient can be calculated based on the values in table 500. With $\alpha$ known at $1.5932 \times 10^{-4}$ (in $\text{psi}^{-1}$) and a relationship between $\xi_s$ and $\alpha$ (Eq. 5) an actual Biot coefficient ($\beta$) for the core 104 can then be calculated by averaging the "per series" actual Biot coefficients. A final $\beta$ can be from the average of the values from each series.

This information, as well as the effective stress coefficient can be presented to an operator of the permeability test assembly 100 (for example, during step 216), as well as used in hydrocarbon exploration and production operations. For example, it is known that hydrocarbon production increases with a decreasing pore pressure as time goes. To predict a long-term production, it is useful to know the permeability changes as the pore pressure decreases. Permeability is related to the pore pressure and Biot coefficient. While it is easy to measure effective stress coefficient dependence, Biot coefficient is normally assumed at a value of 1, and this results in inaccuracies in permeability values used during well production. This can lead to inaccuracy in an estimate of total hydrocarbon production within a particular time period and therefore, an inaccuracy in economic value of a well and field.

Method 200 can continue at step 214, which includes a determination of whether the actual Biot coefficient (determined in step 212) is within a threshold of the selected Biot coefficient. For example, as described, the selected Biot coefficient was 0.7 for the lowest boundary of the pre-estimated range of 0.7 to 1 for this example. The actual Biot coefficient was calculated in step 212 as 0.78. Thus, in this example, the threshold is satisfied and method 200 can continue to step 216, where data can be output and used as previously described.

However, if the determination in step 214 is that the actual Biot coefficient (determined in step 212) is not within a threshold of the selected Biot coefficient, then method 200 can continue back to step 204 and repeat steps 204-212 but with an adjusted Biot coefficient. For example, if the actual Biot coefficient was determined to be less than 0.7 or greater than 1, then the threshold is not met.

Figure 7:
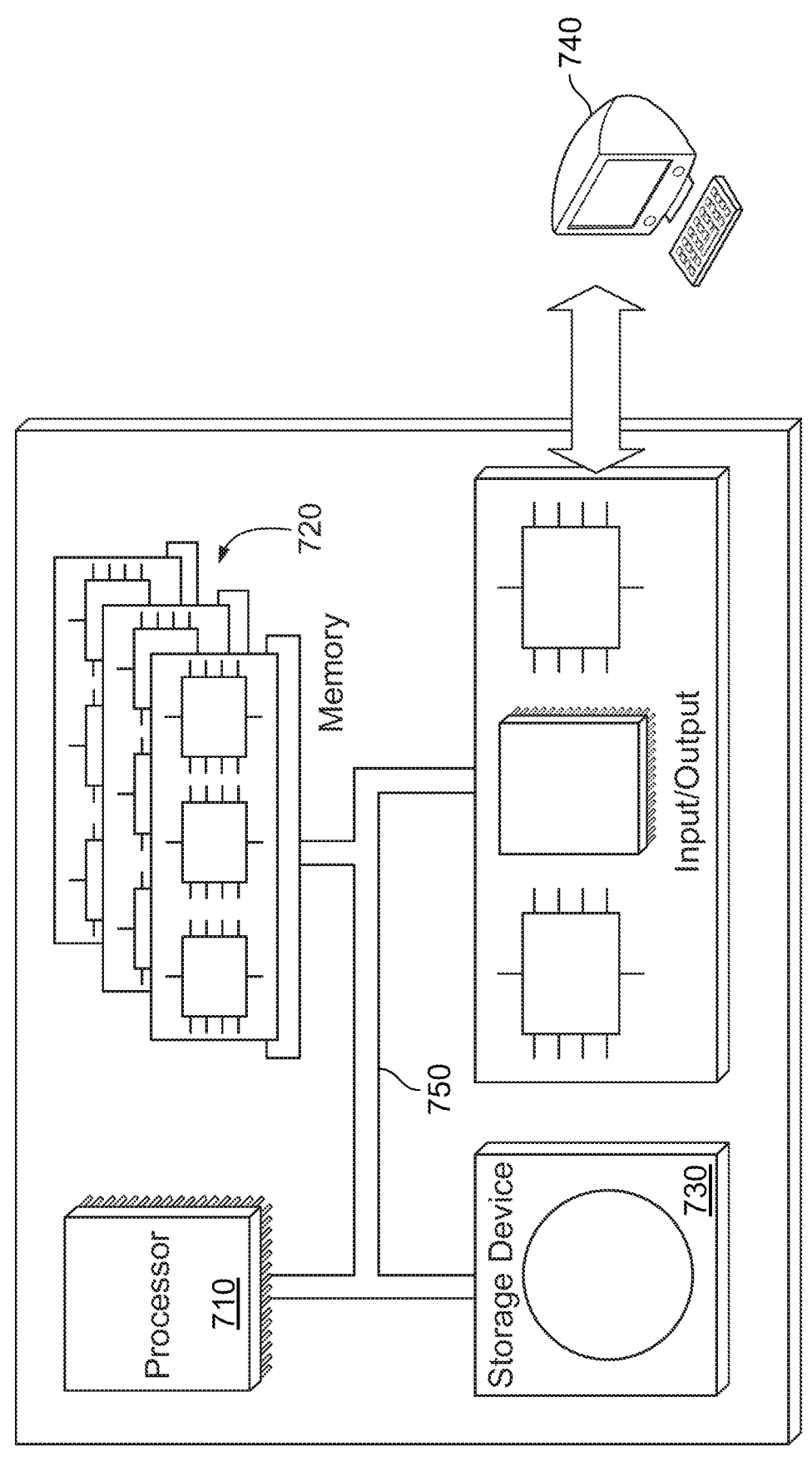
FIG. 7 is a control system (or controller) for a system for determining one or more parameters of a rock sample according to the present disclosure.

FIG. 7 is a control system (or controller) 700 for a system for determining one or more parameters of a rock sample (such as the permeability test assembly 100 shown in FIG. 1) according to the present disclosure. For example, all or parts of the controller 700 can be used for the operations described previously, for example as or as part of the control system 999 shown in FIG. 1. In some aspects, the control system 700 can represent one of multiple control systems 999 used in the system of FIG. 1. The controller 700 is intended to include various forms of digital computers, such as printed circuit boards (PCB), processors, digital circuitry, or otherwise. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 700 includes a processor 710, a memory 720, a storage device 730, and an input/output device 740. Each of the components 710, 720, 730, and 740 are interconnected using a system bus 750. The processor 710 is capable of processing instructions for execution within the controller 700. The processor may be designed using any of a number of architectures. For example, the processor 710 may be a CISC (Complex Instruction Set Computers) processor, a RISC (Reduced Instruction Set Computer) processor, or a MISC (Minimal Instruction Set Computer) processor.

In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the controller 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the controller 700. In one implementation, the storage device 730 is a computer-readable medium. In various different implementations, the storage device 730 may be a floppy disk device, a hard disk device, an optical disk device, a tape device, flash memory, a solid state device (SSD), or a combination thereof.

The input/output device 740 provides input/output operations for the controller 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A method of determining one or more properties of a rock sample, comprising:

(i) performing a plurality of series of permeability measurements of a rock sample with a permeability test assembly to derive a plurality of permeability values, where:

each series of the plurality of series comprises a plurality of permeability measurements of the rock sample at a respective, constant differential pressure between a particular confining pressure and a particular pore pressure, the particular confining pressure and the particular pore pressure increase with each permeability measurement within each series of the plurality of permeability measurements, and the respective, constant differential pressure increases with each subsequent series of permeability measurements in the plurality of series of permeability measurements;

(ii) for each series of the plurality of series, performing a curve fit operation to determine a slope and an intercept of a curve associated with a selected Biot coefficient that is between 0 and 1, the permeability values of the series, and the particular pore pressures of the series to generate a plurality of slope values and a plurality of intercept values;

(iii) determining an effective stress coefficient of the rock sample based on the respective, constant differential pressures and the generated plurality of slope values and plurality of intercept values; and (iv) determining an actual Biot coefficient of the rock sample based on the determined effective stress coefficient and the plurality of slope values.

2. The method of claim 1, wherein the particular pore pressure of a first series of the plurality of series is at least 1700 psi.

3. The method of claim 1, wherein the plurality of series comprise at least three series, and the plurality of permeability measurements comprise at least three permeability measurements.

4. The method of claim 1, wherein the selected Biot coefficient is at a lower boundary value of a predetermined range.

5. The method of claim 1, further comprising:

determining an effective stress differential between successive permeability measurements in a particular series of permeability measurements; and adjusting at least one of the particular confining pressure or the particular pore pressure in the particular series based on the determined effective stress differential being negative.

6. The method of claim 1, further comprising:

adjusting at least one of the particular confining pressure or the particular pore pressure in a particular series to maintain a non-negative effective stress differential between successive permeability measurements in the particular series of permeability measurements.

7. The method of claim 1, wherein performing the curve fit operation comprises:

for each series of the plurality of series:

plotting a curve of ln(k) versus the particular pore pressures for the respective, constant differential pressure of the series, where k is the permeability value measured for each particular pore pressure for the respective, constant differential pressure of the series; and determining the slope value and the intercept value from the plotted curve.

8. The method of claim 1, wherein determining the effective stress coefficient of the rock sample comprises:

plotting a curve of the plurality of intercept values versus the respective, constant differential pressures of the series; and determining the effective stress coefficient of the rock sample based on the slope of the plotted curve.

9. The method of claim 1, wherein determining the actual Biot coefficient of the rock sample comprises:

for each series of the plurality of series, determining a Biot coefficient based on the determined effective stress coefficient and the slope value for the series; and determining the actual Biot coefficient based on an average of the determined Biot coefficients.

10. The method of claim 9, further comprising:

determining a difference between the determined actual Biot coefficient and the selected Biot coefficient;

based on the difference exceeding a threshold value, determining another selected Biot coefficient; and repeating (i)-(iv) with the another selected Biot coefficient.

11. A system for determining one or more properties of a rock sample, comprising:

a permeability test assembly configured to perform a plurality of series of permeability measurements of a rock sample to derive a plurality of permeability values, where:

each series of the plurality of series comprises a plurality of permeability measurements of the rock sample at a respective, constant differential pressure between a particular confining pressure and a particular pore pressure, the particular confining pressure and the particular pore pressure increase with each permeability measurement within each series of the plurality of permeability measurements, and the respective, constant differential pressure increases with each subsequent series of permeability measurements in the plurality of series of permeability measurements; and a control system configured to perform operations comprising:

identifying the plurality of permeability values, the respective, constant differential pressure for each series, the particular confining pressures, and the particular pore pressures from the permeability test assembly;

for each series of the plurality of series, performing a curve fit operation to determine a slope and an intercept of a curve associated with a selected Biot coefficient that is between 0 and 1, the permeability values of the series, and the particular pore pressures of the series to generate a plurality of slope values and a plurality of intercept values;

determining an effective stress coefficient of the rock sample based on the respective, constant differential pressure and the generated plurality of slope values and plurality of intercept values; and determining an actual Biot coefficient of the rock sample based on the determined effective stress coefficient and the plurality of slope values.

12. The system of claim 11, wherein the particular pore pressure of a first series of the plurality of series is at least 1700 psi.

13. The system of claim 11, wherein the plurality of series comprise at least three series, and the plurality of permeability measurements comprise at least three permeability measurements.

14. The system of claim 11, wherein the selected Biot coefficient is between 0.7 and 1.

15. The system of claim 11, wherein the operations further comprise determining an effective stress differential between successive permeability measurements in a particular series of permeability measurements, and the permeability test assembly is configured to adjust at least one of the particular confining pressure or the particular pore pressure in the particular series based on the determined effective stress differential being negative.

16. The system of claim 11, wherein the permeability test assembly is configured to adjust at least one of the particular confining pressure or the particular pore pressure in a particular series to maintain a non-negative effective stress differential between successive permeability measurements in the particular series of permeability measurements.

17. The system of claim 11, wherein the operation of performing the curve fit operation comprises:

for each series of the plurality of series:

plotting a curve of ln (k) versus the particular pore pressures for the respective, constant differential pressure of the series, where k is the permeability value measured for each particular pore pressure for the respective, constant differential pressure of the series; and determining the slope value and the intercept value from the plotted curve.

18. The system of claim 11, wherein the operation of determining the effective stress coefficient of the rock sample comprises:

plotting a curve of the plurality of intercept values versus the respective, constant differential pressures of the series; and determining the effective stress coefficient of the rock sample based on the slope of the plotted curve.

19. The system of claim 11, wherein the operation of determining the actual Biot coefficient of the rock sample comprises:

for each series of the plurality of series, determining a Biot coefficient based on the determined effective stress coefficient and the slope value for the series; and determining the actual Biot coefficient based on an average of the determined Biot coefficients.

20. The system of claim 19, wherein the operations further comprise:

determining a difference between the determined actual Biot coefficient and the selected Biot coefficient; and based on the difference exceeding a threshold value, determining another selected Biot coefficient.

21. The system of claim 20, wherein the operations further comprise:

identifying another plurality of permeability values, another respective, constant differential pressure for another plurality of series, another set of particular confining pressures, and another set of particular pore pressures from the permeability test assembly;

for each series of the another plurality of series, performing a curve fit operation to determine a slope and an intercept of a curve associated with the another selected Biot coefficient, the another plurality of permeability values of the another plurality of series, and the another set of particular pore pressures of the series to generate another plurality of slope values and another plurality of intercept values;

determining another effective stress coefficient of the rock sample based on the another respective, constant differential pressure and the generated another plurality of slope values and plurality of intercept values; and determining another actual Biot coefficient of the rock sample based on the determined another effective stress coefficient and the another plurality of slope values.

22. A computer-implemented method for determining one or more properties of a rock sample, comprising:

identifying, with one or more hardware processors, information from a plurality of series of permeability measurements of a rock sample taken by a permeability test assembly, the information comprising a plurality of permeability values, with each series of the plurality of series comprising a set of permeability measurements of the rock sample at a respective, constant differential pressure between a particular confining pressure and a particular pore pressure, with the particular confining pressure and the particular pore pressure increasing with each permeability measurement within each series of the plurality of permeability measurements, and the respective, constant differential pressure increases with each subsequent series of permeability measurements in the plurality of series of permeability measurements;

for each series of the plurality of series, performing, with the one or more hardware processors, a curve fit operation to determine a slope and an intercept of a curve associated with a selected Biot coefficient that is between 0 and 1, the permeability values of the series, and the particular pore pressures of the series to generate a plurality of slope values and a plurality of intercept values;

determining, with the one or more hardware processors, an effective stress coefficient of the rock sample based on the respective, constant differential pressure and the generated plurality of slope values and plurality of intercept values; and determining, with the one an actual Biot coefficient of the rock sample based on the determined effective stress coefficient and the plurality of slope values.

23. The computer-implemented method of claim 22, wherein the particular pore pressure of a first series of the plurality of series is at least 1700 psi.

24. The computer-implemented method of claim 22, wherein the plurality of series comprise at least three series, and the plurality of permeability measurements comprise at least three permeability measurements.

25. The computer-implemented method of claim 22, wherein the selected Biot coefficient is between 0.7 and 1.

26. The computer-implemented method of claim 22, further comprising:

determining, with the one or more hardware processors, an effective stress differential between successive permeability measurements in a particular series of permeability measurements; and providing, with the one or more hardware processors, an indication to adjust at least one of the particular confining pressure or the particular pore pressure in the particular series based on the determined effective stress differential being negative.

27. The computer-implemented method of claim 22, further comprising providing, with the one or more hardware processors, an indication to adjust at least one of the particular confining pressure or the particular pore pressure in a particular series to maintain a non-negative effective stress differential between successive permeability measurements in the particular series of permeability measurements.

28. The computer-implemented method of claim 22, wherein performing the curve fit operation comprises:

for each series of the plurality of series:

plotting, with the one or more hardware processors, a curve of ln (k) versus the particular pore pressures for the respective, constant differential pressure of the series, where k is the permeability value measured for each particular pore pressure for the respective, constant differential pressure of the series; and determining, with the one or more hardware processors, the slope value and the intercept value from the plotted curve.

29. The computer-implemented method of claim 22, wherein determining the effective stress coefficient of the rock sample comprises:

plotting, with the one or more hardware processors, a curve of the plurality of intercept values versus the respective, constant differential pressures of the series; and determining, with the one or more hardware processors, the effective stress coefficient of the rock sample based on the slope of the plotted curve.

30. The computer-implemented method of claim 22, wherein determining the actual Biot coefficient of the rock sample comprises:

for each series of the plurality of series, determining, with the one or more hardware processors, a Biot coefficient based on the determined effective stress coefficient and the slope value for the series; and determining, with the one or more hardware processors, the actual Biot coefficient based on an average of the determined Biot coefficients.

31. The computer-implemented method of claim 30, further comprising:

determining, with the one or more hardware processors, a difference between the determined actual Biot coefficient and the selected Biot coefficient; and based on the difference exceeding a threshold value, determining, with the one or more hardware processors, another selected Biot coefficient.

32. The computer-implemented method of claim 31, further comprising:

identifying, with the one or more hardware processors, additional information from the permeability test assembly, the additional information comprising another plurality of permeability values, another respective, constant differential pressure for another plurality of series, another set of particular confining pressures, and another set of particular pore pressures from the permeability test assembly;

for each series of the another plurality of series, performing, with the one or more hardware processors, a curve fit operation to determine a slope and an intercept of a curve associated with the another selected Biot coefficient, the another plurality of permeability values of the another plurality of series, and the another set of particular pore pressures of the series to generate another plurality of slope values and another plurality of intercept values;

determining, with the one or more hardware processors, another effective stress coefficient of the rock sample based on the another respective, constant differential pressure and the generated another plurality of slope values and plurality of intercept values; and determining, with the one or more hardware processors, another actual Biot coefficient of the rock sample based on the determined another effective stress coefficient and the another plurality of slope values.

* * * * *